United States Patent
Arvidsson

(10) Patent No.: US 6,595,727 B2
(45) Date of Patent: Jul. 22, 2003

(54) TOOL FOR CHIP REMOVING MACHINING AND HAVING FLUID-CONDUCTING BRANCH DUCTS

(75) Inventor: Peder Arvidsson, Gävle (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/780,505

(22) Filed: Feb. 12, 2001

(65) Prior Publication Data
US 2002/0009339 A1 Jan. 24, 2002

(30) Foreign Application Priority Data
Feb. 11, 2000 (SE) .............................. 0000427

(51) Int. Cl.[7] .............................. B23B 27/16; B26D 1/12
(52) U.S. Cl. ............................. 407/35; 407/43
(58) Field of Search .............................. 407/11, 25, 30, 407/35, 33, 43, 66, 67; 408/57, 59, 56, 58; 409/136; 192/113.36

(56) References Cited

U.S. PATENT DOCUMENTS

| | | | |
|---|---|---|---|
| 960,526 A | 6/1910 | Erlandsen | |
| 2,080,401 A | * 5/1937 | Heard | 29/106 |
| 2,478,846 A | * 8/1949 | Smith | 125/20 |
| 2,975,507 A | 3/1961 | Wilder | |
| 3,028,772 A | * 4/1962 | Mosberg | 77/58 |
| 3,597,817 A | 8/1971 | Whalley | |
| 3,798,726 A | 3/1974 | Dudley | |
| 3,811,163 A | 5/1974 | Frederick et al. | |
| 3,899,814 A | 8/1975 | Kralowetz | |
| 3,971,114 A | * 7/1976 | Dudley | 407/120 |
| 4,456,408 A | 6/1984 | Glasow | |
| 5,288,186 A | 2/1994 | Kovacevic | |
| 5,290,135 A | 3/1994 | Ball et al. | |
| 5,388,487 A | * 2/1995 | Danielsen | 279/2.08 |
| 5,439,327 A | * 8/1995 | Wertheim | 407/11 |
| 5,542,791 A | 8/1996 | Ball et al. | |
| 5,941,664 A | 8/1999 | Morsch | |
| 6,053,672 A | 4/2000 | Satran et al. | |
| 6,450,738 B1 | 9/2002 | Ripley | |

FOREIGN PATENT DOCUMENTS

| | | |
|---|---|---|
| DE | 31 04 752 | 8/1982 |
| DE | 4 019 506 | 1/1992 |
| DE | 31 05 933 | 8/1992 |
| DE | 197 25 100 | 12/1998 |
| DE | 198 37 704 | 3/2000 |

* cited by examiner

Primary Examiner—Steven C. Bishop
Assistant Examiner—D. J. Bleasdell
(74) Attorney, Agent, or Firm—Burns, Doane, Swecker & Mathis, LLP

(57) ABSTRACT

A milling tool includes a rotary cutting head having an end surface in which grooves are formed. The grooves communicate with a duct extending coaxially completely through the center of the cutting head to conduct cooling/lubricating fluid to cutting inserts mounted at outer ends of the grooves. The grooves induce a flow of fluid from inner ends of the grooves to the outer ends in response to rotation of the cutting head. A removable deflector can be attached to the end surface to deflect fluid from the main duct to the grooves.

27 Claims, 6 Drawing Sheets

TOOL FOR CHIP REMOVING MACHINING AND HAVING FLUID-CONDUCTING BRANCH DUCTS

RELATED INVENTION

This application claims priority under 35 U.S.C. §§ 119 and/or 365 to patent application Ser. No. 0000427-5 filed in Sweden on Feb. 11, 2000; the entire content of which is hereby incorporated by reference.

TECHNICAL FIELD OF THE INVENTION

This invention relates to a tool intended for chip removing machining. In particular, the tool is of the type that comprises a rotatable head having an envelope surface extending rotationally symmetrically around a central axis of geometrical rotation and an end surface extending transversely to said axis, as well as a plurality of tangentially spaced-apart cutting inserts in connection with chip spaces formed in a circumferencial edge portion in the transition between the envelope surface and the end surface. The head includes, on the one hand, an internal, central main duct which has the purpose of conducting a cooling and/or lubricating fluid received from an outside source, and, on the other hand, a number of branch ducts corresponding to the number of cutting inserts and chip spaces with the purpose of individually directing said fluid from the main duct towards the different cutting inserts.

PRIOR ART

Tools of the type generally described above may be in the form of milling cutters, in particular face mills. Development in modern milling technology is directed towards higher and higher cutting speeds. This development is especially marked in the milling of easily workable materials, such as aluminium. Thus cutting speeds of up to the range of about 8,000–10,000 m/min are already used today in the machining of aluminum. Such speeds for a face mill having a diameter of 100 mm would require rotational speeds in the range of 25,000–32,000 rpm. For different reasons, some sort of fluid is supplied to the individual cutting inserts during the machining operation. In some cases, cooling liquid is supplied for the purpose of cooling the cutting inserts as well as the workpiece and in other cases air with a mist of oil may be supplied for the purpose of providing lubrication and a certain cooling. Also cooling gases may be supplied. Fundamental for the cooling or lubrication fluid is the purpose of giving the machined surfaces on the workpiece optimal properties, to cool the cutting inserts and the workpiece, as well as to counteract smearing of the machined material, e.g. aluminium, on the tool. Another purpose of the fluid is to remove the chips that the cutting inserts remove from the workpiece.

Rotatable tools of the type initially mentioned in general terms are previously known from, e.g., U.S. Pat. No. 960, 526 and German Documents DE-3 104 752, DE-4019 506, DE-19 837 704 and DE-3 105 933. Common for these known tools is that the branch ducts from the main duct for the fluid consist of drilled holes.

A rotatable tool holder is previously known from U.S. Pat. No. 5,941,664, which, per se, includes a number of individual fluid branch ducts. The branch ducts are defined by blades, which together form an impeller so as to feed cooling liquid from outside into a central main duct.

German Document DE-197 25 100 describes a milling tool which in connection with the cutting insert-equipped end surface thereof has a central distributor body having a plurality of radially directed nozzles through which cooling liquid may be supplied out to the peripherally situated cutting inserts. However, not even here are any open grooves to be found in said end surface.

Commercially available milling tools, which were known previously, utilise different solutions to lead the cooling and/or lubricating fluid to different cutting inserts on the tool. A commonly occurring solution is based on using branch ducts in the form of holes, which are drilled from points in the immediate vicinity of the individual cutting inserts to a central main duct inside the cutter head. This manufacturing method is, however, complicated and expensive as well as giving mediocre results with regarding the ability of the fluid to cool the cutting inserts and the workpiece and to remove the liberated chips.

AIMS AND FEATURES OF THE INVENTION

The present invention aims at obviating the shortcomings of previously known milling tools and at providing an improved milling tool. Therefore, a primary aim of the invention is to provide a tool which is able to lead the requisite fluid to the different cutting inserts in an effective and powerful manner so as to, in this way, optimise the cooling and/or lubricating effect of the fluid. Furthermore, the invention aims at providing a tool which may guide and make effective the flow of chips from the cutter head in such a way that erosion of the surfaces of the chip spaces is counteracted. Another aim of the invention is to create a tool, which may be manufactured in a simple and inexpensive way. Another aim of the invention is to create a tool having minimum weight, which facilitates operations at high rotational, speeds, in particular in respect to the starting and stopping of the tool.

SUMMARY OF THE INVENTION

The present invention involves a tool for chip removing machining which comprises a rotary head that defines a longitudinal axis of rotation. The head includes an envelope surface arranged generally symmetrically relative to the axis, and a front end surface extending transversely relative to the axis. A plurality of circumferentially spaced insert seats are provided in the head for receiving respective cutting inserts. Each insert seat is disposed in a transition region between the envelope surface and the end surface. A main duct extends longitudinally within the head for conducting fluid. The main duct intersects the end surface. A plurality of branch ducts extend transversely from the main duct for conducting fluid from the main duct to the insert seats. Each branch duct is defined by a groove formed in the end surface and is configured to induce a flow of fluid from a fluid inlet end thereof to a fluid outlet end thereof in response to rotation of the head.

Preferably, a substantial portion of each groove is open in the axial direction.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
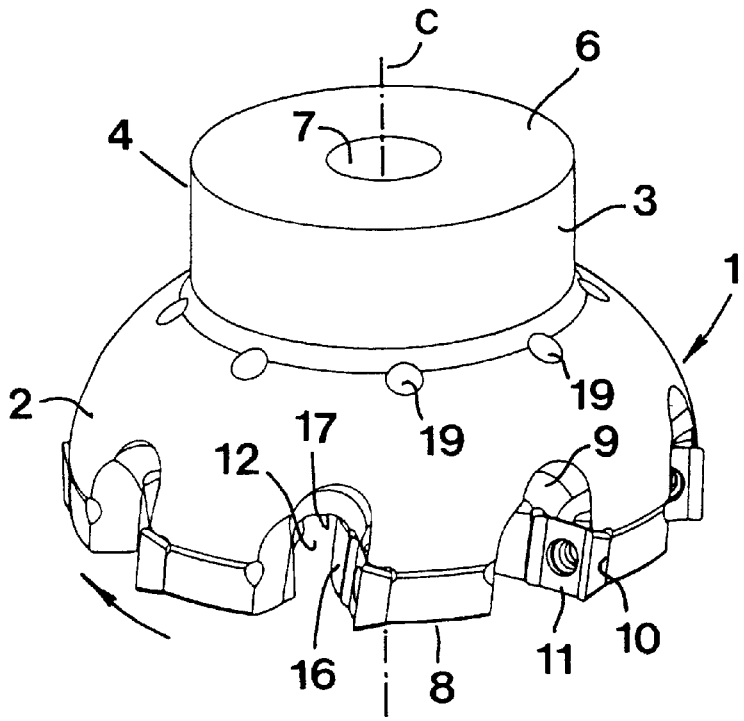
FIG. 1 is a perspective view of a milling tool according to the invention.
Figure 2:
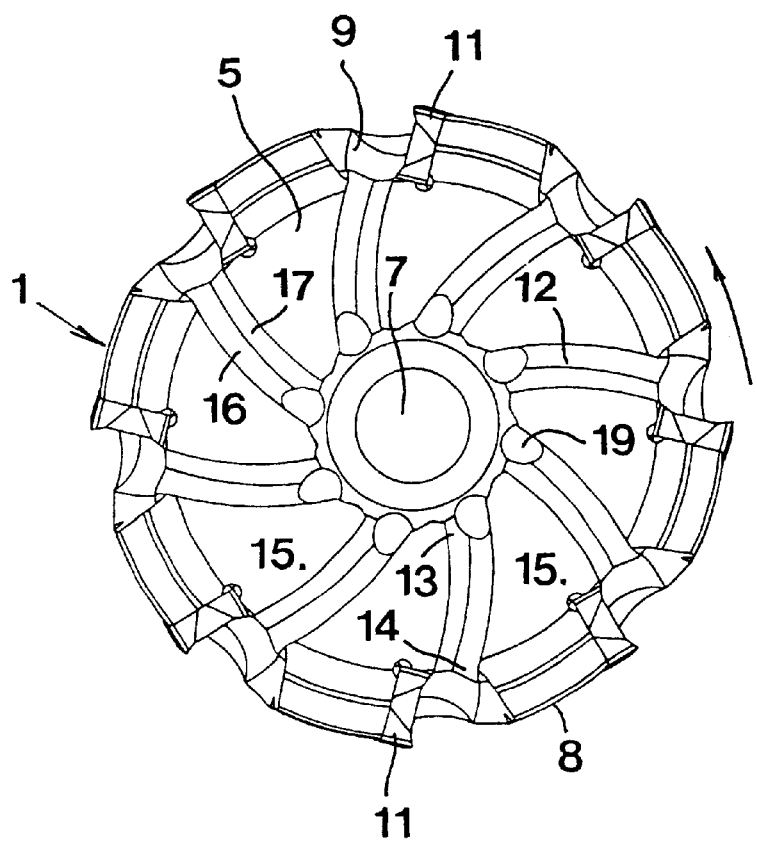
FIG. 2 is a planar view from above of the tool according to FIG. 1 in an upside-down position.
Figure 3:
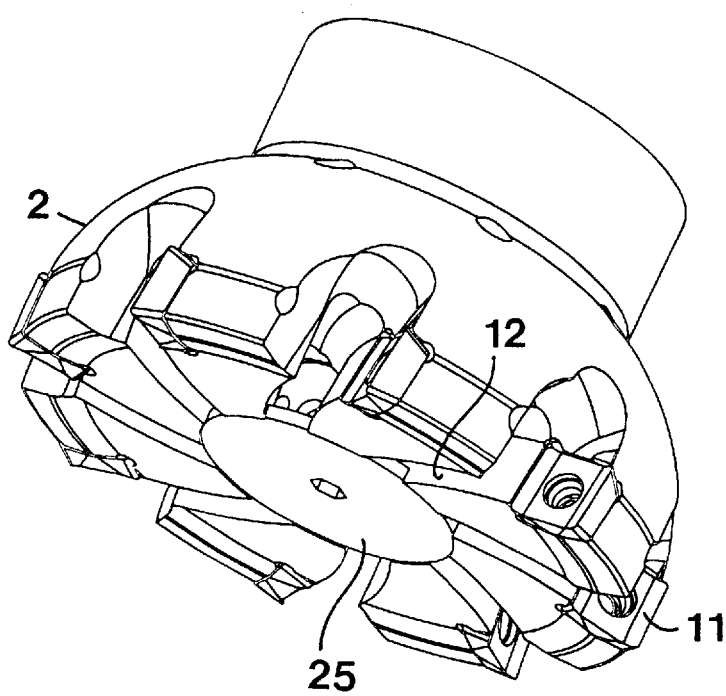
FIG. 3 is a perspective view of an alternative embodiment of a tool as seen obliquely from below.
Figure 4:
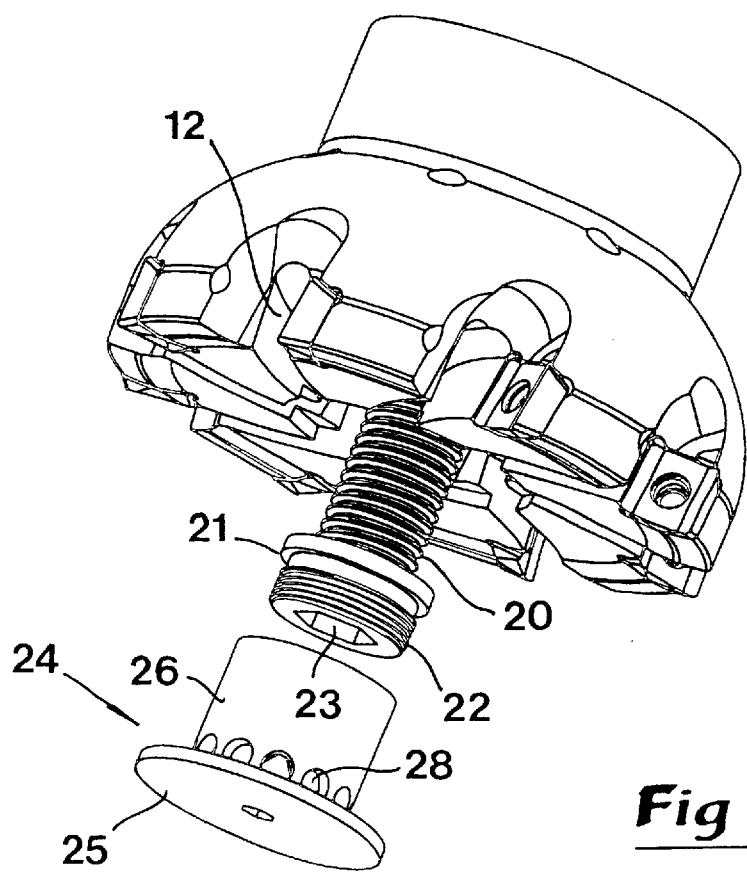
FIG. 4 is an analogous perspective exploded view showing the same tool having a fluid distributing device shown separated from the tool.

The tool illustrated in FIGS. 1 and 2 is in the form of a cutter head 1 which is rotatable around a central, geometrical axis of rotation C. A convexly spherical envelope surface 2 extends rotationally symmetrically around the axis C, which surface 2 transforms into a cylinder surface 3 on a shaft-like portion 4 of the cutter head. A first, planar end surface 5 which is opposite a second planar end surface 6 on the shaft portion 4 extends perpendicularly to the axis of rotation C. Between these end surfaces 5, 6, a central main duct 7 extends, in the form of a hole, e.g. a bore hole, through which cooling liquid or another fluid may pass. In an edge portion 8 forming a transition between the envelope surface 2 and the end surface 5, a plurality of tangentially spaced recessed chip spaces 9 are formed. In connection with said chip spaces, seats 10 are formed in which cutting inserts 11 are removably mounted. It is to advantage if said cutting inserts are of an indexable type, whereby the cutting inserts are fixed by means of screws.

Characteristic of the tool according to the invention is that a number of axially open grooves or recesses 12 are formed in the end surface 5. More precisely, the number of grooves 12 corresponds to the number of cutting inserts 11 and to the number of chip spaces 9. The grooves 12 form branch ducts extending transversely relative to the main duct, to direct the fluid from the main duct to the respective cutting inserts 11. In the preferred embodiment of FIGS. 1–2 each individual branch duct is curved and extends from an inner (inlet) end 13 located near the outer port of the main duct 7 to an outer (outlet) end 14 situated in front of the individual cutting insert 11 with reference to the direction of rotation of the tool (see the arrows in FIGS. 1 and 2). More precisely, the individual groove is preferably formed in such a way that the convex side of the groove curvature faces in the direction of rotation (see FIG. 2). Alternatively, the groove curvature could be reversed so that the convex side faces in the same direction as the rotational direction. Still further, the groove could be straight instead of curved and extend either radially or non-radially.

Land portions 15 having a wedge-like, inwardly tapering basic shape are defined by respective portions of the surface 5 located between the different grooves 11. The surfaces of these land portions are planar and situated in a common plane (i.e., the plane of the end surface 5) which is axially separated from another common plane in which horizontal, lower portions of the cutting inserts 11 are situated. In this connection, it should also be pointed out that radially outer cutting edges of the cutting inserts protrude somewhat from the envelope surface 2.

Figure 6A:
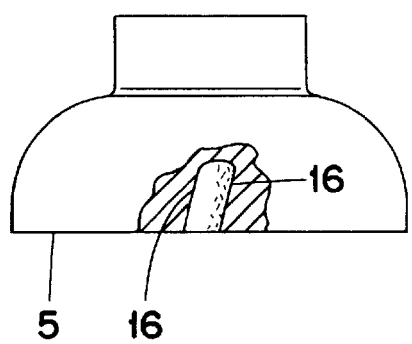
FIG. 6a is a schematic side view of the tool of FIG. 1.

Each individual groove 12 is delimited by two spaced-apart side surfaces 16, 16 and an intermediate, suitably concavely rounded bottom surface 17 (of the two side surfaces 16, only one is visible in FIGS. 1 and 2, respectively). In the embodiment illustrated in FIGS. 1 and 2, the individual groove 12 is equally thin along the entire longitudinal extension thereof from the inner end 13 to the outer end or the opening 14. Furthermore, the side surfaces 16 of the individual groove are mutually parallel, and are oblique in relation to the axis of rotation C of the tool, as viewed in a cross section through the groove (see FIG. 6a). More precisely, the side surfaces of the grooves are oblique in such a way that they lean upwards and rearwards with reference to the direction of rotation of the tool.

Figure 6B:
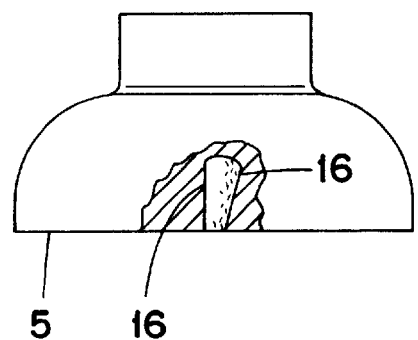
FIG. 6b Is a modified schematic view of the tool of FIG. 1.

However, it is alternatively possible to form the groove in such a way that both of the parallel side surfaces extend substantially parallel to the axis of rotation of the tool. In this connection it should also be mentioned that it is feasible to form the groove with, on the one hand, one side surface which is parallel to the axis of rotation, and, on the other hand, one side surface which is oblique relative to the axis of rotation as shown in FIG. 6b.

Although different curvatures of the grooves 12 are feasible (i.e, the curvature as seen in FIG. 2), generally a cycloidal basic shape is preferred, whereby the cycloidal curve has a diameter that increases in the direction of the outer end of the groove.

The tool illustrated in FIGS. 1 and 2 operates in the following way.

From a suitable outer source (not shown), pressurized fluid (e.g., cooling liquid or air with a mist of oil) is fed into the main duct 7 via the end thereof which terminates in the upper end surface 6 of the shaft portion 4. When the tool is rotated at high speed, e.g. at a rotational speed of 25,000 rpm or more, a suction effect arises in each of the grooves 12 which attempts to suck the fluid from the lower end of the main duct in an outward direction outwards, towards the cutting inserts 11. This suction effect means that the end portion of the cutter head during the rotation of the mill acts as an impeller in which the land portions 15 between nearby grooves constitute fan blades. In the same way as in a conventional fan, a negative pressure which acts radially in the direction outwards from the center of the fan is provided along "the rear surface of each wing", i.e., along the side surface 16 behind each leading land portion. More precisely, the particles included in the fluid are pressed rearwards towards the opposite side surface 16 and are at the same time slung radially outwards by the centrifugal force.

Initial deflection of the axial main flow in the duct 7 into respective radial flows in each one of the grooves 12 may take place in various ways depending on different factors, such as the rotational speed of the tool, the nature of the fluid as well as the pressure and volume of the incoming fluid. In the embodiment according to FIGS. 1 and 2, deflection is assumed to take place without the help of particular means of deflection. This may for instance take place by first causing the tool to rotate at maximum speed and then starting and successively increasing the supply of fluid to the main duct 7. It is also feasible to load the grooves with fluid in a suitable way in connection with the commencement of rotation of the tool.

The result of the fanning effect achieved by means of the grooves is dependent on the mass flow of the fluid. If the mass flow through the main duct 7 for different reasons would become unsatisfactory for various reasons, the effect would be deteriorated (the fan has its own pump characteristics). In order to counteract the risk of insufficient mass flow through the main duct, air inlet channels 19 may be drilled in the cutter head. More precisely, for each groove a channel hole 19 is drilled from an outer point near the shaft portion 4 of the cutter head to an inner point in the area of the inner end 13 of the individual groove 12. Such holes, which may be of comparatively small diameter, are in practice simple to produce in connection with the manufacture of the tool. Through the holes, air is sucked in from outside and added to the partial mass flows of fluid to the different grooves.

The fluid radially sucked-out through each individual groove will sweep along the appurtenant cutting insert 11 and cool or lubricate this insert as well as the portion of the workpiece with which the cutting insert is in instantaneous contact. Thereby, the fluid will see to it that chips are washed away not only from the cutting insert and the workpiece but also from the surfaces which define each individual chip space 9. In this connection, it should be emphasized that the partial flows of fluid through the grooves form jets, which throw out the chips in the radial direction in a common plane, directed perpendicularly to the axis of rotation of the tool. In this way, the flows of chips are directed out from the tool in an optimal way.

Figure 5:
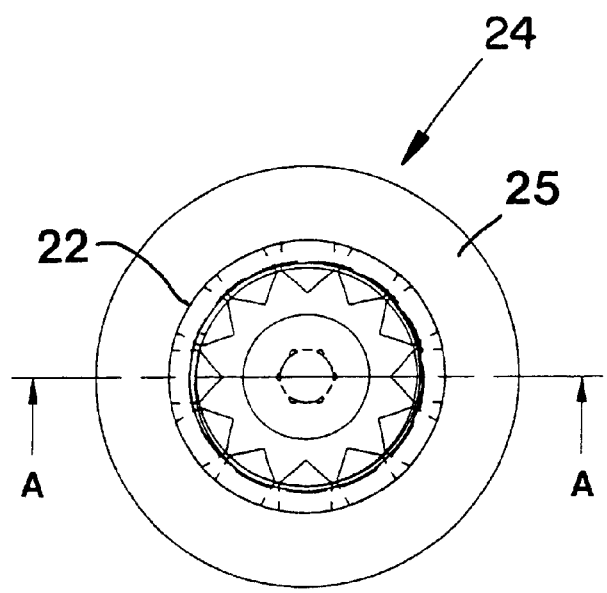
FIG. 5 is a planar view from above of the distributor device according to FIG. 4.
Figure 5A:
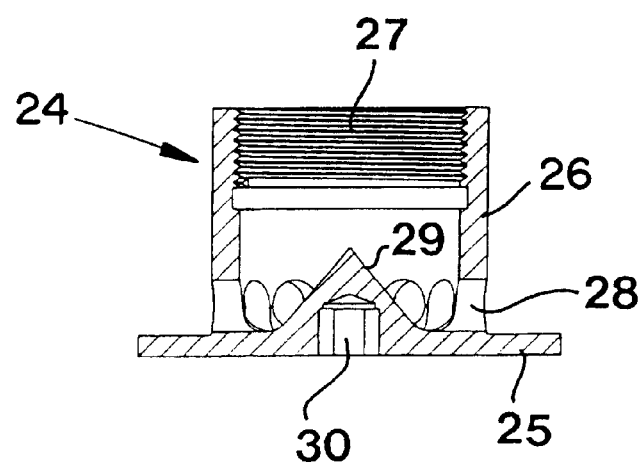
FIG. 5a is a cross-sectional view taken along line A—A in FIG. 5.

Reference is now made to FIGS. 3 through 6b, which illustrate embodiments according to which the cutter head has been provided with particular means in order to divide the axial main flow of the fluid into respective radial flows. More precisely, the tool includes a screw 20 by means of which the tool may be fixed in the usual way in a tool holder (not shown). The screw 20 comprises a hollow tubular screw which has a center cavity for allowing axial passage of fluid, and also has a head 21 having a male screw thread 22. The cavity in the interior of the tubular screw terminates as a hexagonal socket 23 in which a key may be applied to tighten the screw. A distributor device 24 co-operates with the screw head 21, which device is composed of a circular plate 25 and a cylindrical bushing 26, which has an internal screw thread 27 (see FIG. 5a). In the example shown, the plate 25 has a larger diameter than the bushing 26, whereby the plate flares out radially a distance from the bushing, but leaves a substantial portion of each groove 12 open in the axial direction. In the immediate vicinity of the plate, the bushing has a number of radial holes 28 through which fluid may pass in a radially outward direction. On the inside thereof, the plate 25 has a conical body 29 which when it is hit by the axial fluid flow directs the fluid radially outwardly toward the holes 28 (see FIG. 5a). In the conical body 29, a hexagonal socket 30 is also formed for receiving a key, by means of which the cap may be tightened on the screw head 21.

The function of the cap is described below. When fluid is fed downwardly (axially forwardly through the main duct 7) and then through the tubular screw 20, the conical body 29 and the plate 25 function to deflect the fluid radially outwardly. The holes 28 divide the deflected fluid into respective radial flows. Those flows then enter respective ones of the grooves 12 in the cutter head.

Figure 7:
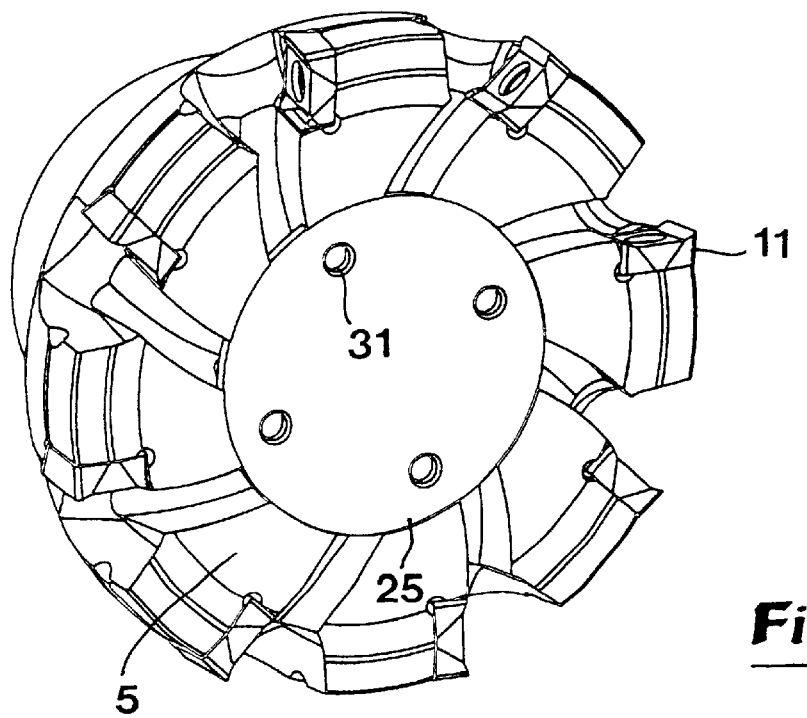
FIG. 7 Is a perspective view showing a third alternative embodiment of the tool according to the invention.
Figure 8:
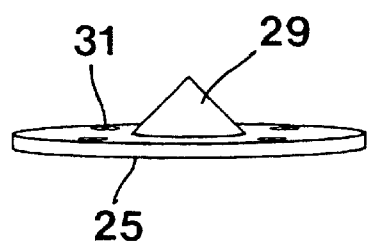
FIG. 8 is a perspective view of a second type of distributor device included in the tool according to FIG. 7.

In FIGS. 7 and 8, an alternative deflector or distributor device is illustrated which also in this case includes a circular plate 25 having an internal conical body 29, but no bushing 26. In this embodiment, the plate 25 has, however, a number of holes 31 for receiving screws (not illustrated) by means of which the plate may be fixed in a circular countersink in the outer or lower end surface 5 of the cutter head. Said holes 31 are placed comparatively near the outer periphery of the plate so that threaded holes (not shown) for receiving the fastening screws may be formed in the surface 5 of the cutter head at locations radially outside of the main duct 7. When the axial fluid flow through the main duct meets the plate 25 and body 29, the fluid will be deflected radially outwardly and then enter respective grooves 12.

Figure 9:
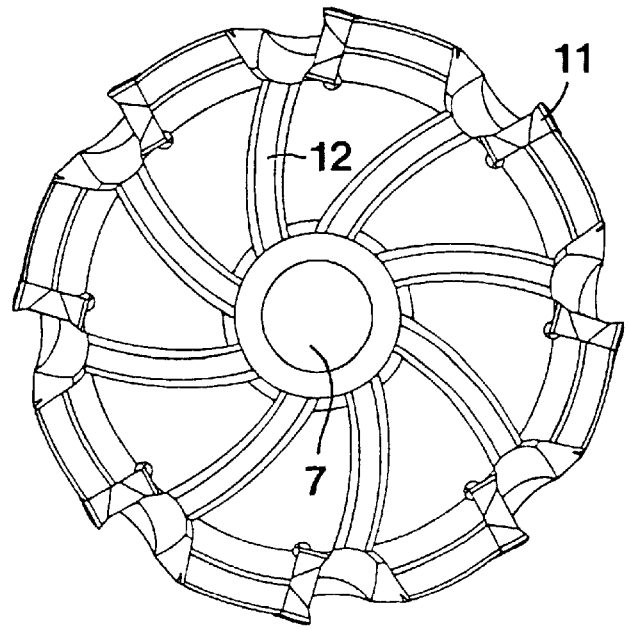
FIG. 9 is a planar view from below of an additional alternative embodiment of the invention.

The embodiment illustrated in FIG. 9 differs from the embodiment according to FIGS. 1 and 2 only in that the air inlet channels 19 are not used.

Figure 10:
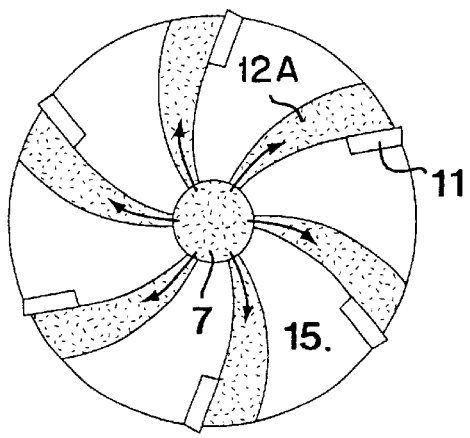
FIG. 10 is a schematic end view of an alternative cutter body.

In the embodiment according to FIGS. 1 and 2, each groove has a cross-sectional area that is constant from the inlet end to the outlet end. However, if desired, the grooves may widen in the direction from the radially inner end thereof to the radially outer ends thereof. Such grooves 12A are schematically illustrated in FIG. 10. In other words, said grooves have an increasing cross-sectional area at increasing radius (i.e., at increasing distance from the axis of rotation). The effect of the grooves widening in the outward direction is that the fluid expands in the grooves and that the turbine fan easily pumps out large partial flows which, however, have only moderate speed.

Figure 11:
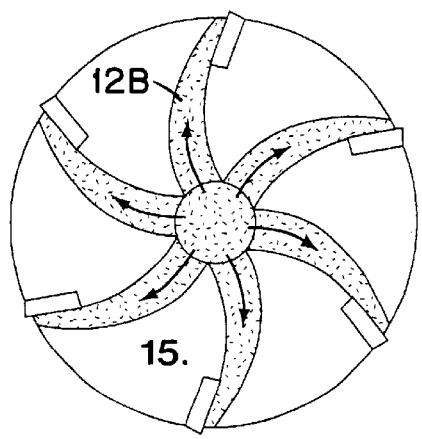
FIG. 11 is a view similar to FIG. 10 of another alternative cutter body.

In FIG. 11, an embodiment is illustrated according to which each individual groove 12B widens in the direction from the outer end thereof to the inner end thereof, i.e., the grooves have decreasing cross sectional area at increasing radius. In this case, the fluid will be compressed in the grooves, whereby the turbine fan pumps out a limited flow of fluid which, however, has greater speed and pressure.

Common for the two embodiments according to FIGS. 10 and 11 is that the grooves 12A or 12B are narrow in comparison with the nearby, surrounding land portions 15. In other words, the total projection area of the grooves is smaller than the total projection area of the land portions as viewed in a direction perpendicular to the end surface 5.

Figure 12:
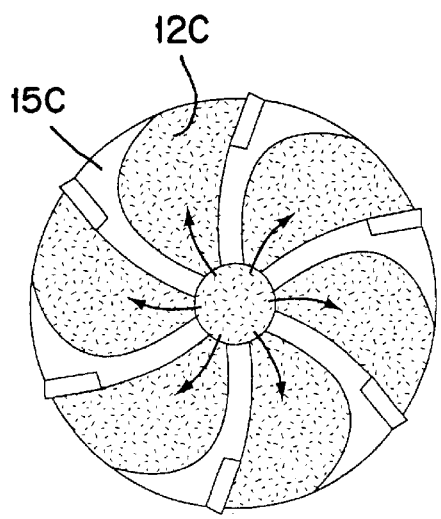
FIG. 12 is a view similar to FIG. 10 showing still another alternative cutter body.

In FIG. 12, an alternative embodiment is shown according to which the total projection area of the grooves or of the recesses 12C is larger than the total projection area of the land portions 15C between the grooves. In other words, here the land portions are comparatively narrow in relation to the grooves. In this embodiment, large quantities of fluid may be pumped out, although at low speed and low pressure.

Figure 13:
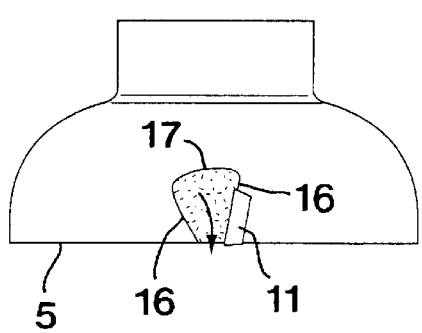
FIG. 13 is a schematic side view illustrating an alternative embodiment of the grooves included in the tool head of the tool.

In FIG. 13, an embodiment is illustrated according to which the two side surfaces 16 of the individual groove 12 diverge from the end surface 5 of the tool head towards the common bottom surface 17.

An important advantage of the invention is that by providing the branch ducts as grooves 12 formed in the end face 5, the fluid therein travels in a plane perpendicularly to the axis of rotation. Therefore, contrary to the obliquely drilled branch duct holes in previously known milling tools, the tool according to the invention guarantees an efficient disposal of chips from the cutting insert and surrounding chip spaces. Furthermore, the manufacture of the tool according to the invention is simple in comparison with previously applied manufacturing methods. Among other things, there is the advantage that the grooves can be cut by an end mill which are faster and thus economically more efficient than drills used to drill oblique holes in prior art tools. Thus, the design does not interfere with the ability of the designer to form and locate the cutting insert and the appurtenant chip spaces, respectively, in an uninhibited way. Another advantage is that the grooves cause a reduction of the total weight of the tool; something which is especially important in connection with high rotary speeds. More precisely, a minimal weight of the tool facilitates the starting as well as the stopping torque of the tool.

Also, in cases where a distributor is provided at the end of the main duct to deflect fluid radially outwardly, the distributor is made to be removable, i.e., a separate element, which enables the grooves to be cut right up to the main duct, and allows the distributor to be replaced if worn or damaged.

FEASIBLE MODIFICATIONS OF THE INVENTION

The invention is not solely restricted to the embodiments described above and shown in the drawings. In case the milling tool is equipped with a distributor or deflector device for deflecting fluid radially outwardly, the distributor plate may be given a larger diameter than the plates which have been exemplified, whereby the grooves will at least partially be covered by the distributor plate. Although the grooves initially in connection with the manufacture are entirely open outwards, the same may thus entirely or partly be covered by a distributor plate in the operative state thereof. Furthermore, the different grooves on one and the same cutter head may be given different widths. For instance, every second groove may be wider than the nearby grooves. Furthermore, different grooves in one and the same cutter head may have different inclinations, either at each one of the two sidewalls defining each groove or at both sidewalls in each pair. Furthermore, the different grooves need not necessarily be equidistantly spaced-apart. Thus, it is feasible to place the grooves irregularly in relation to each other also in the case where the cutting inserts are equidistantly spaced-apart from each other.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A tool for chip removing machining comprising a rotary head defining a longitudinal axis of rotation, the head including:
   an envelope surface arranged generally symmetrically relative to the axis;
   a forwardly facing front end surface extending transversely relative to the axis;
   a plurality of chip spaces formed in a transition region between the envelope surface and the end surface;
   a plurality of circumferentially spaced insert seats configured for receiving respective cutting inserts, each insert seat disposed in a respective chip space;
   a duct extending generally longitudinally within the head for conducting fluid forwardly to the front end surface; and
   a plurality of grooves formed directly in the front end surface and each groove extending along the front end surface transversely of the axis from an inlet end of the groove to an outlet end of the groove, the outlet ends of the grooves communicating with respective chip spaces, and the inlet ends of the grooves communicating with fluid from the duct, wherein the grooves conduct fluid from the duct all the way to respective chip spaces in response to rotation of the head.

2. The tool according to claim 1 wherein a cross-sectional area of at least some of the grooves is constant from the inlet end to the outlet end thereof.

3. The tool according to claim 1 wherein a cross-sectional area of at least some of the grooves increases toward the outlet end thereof.

4. The tool according to claim 1 wherein a cross-sectional area of at least some of the grooves decreases toward the outlet end thereof.

5. The tool according to claim 1 wherein the end face forms lands between successive ones of the grooves, a total area of the grooves being greater than a total area of the lands, as the areas are seen in a direction perpendicular to the end face.

6. The tool according to claim 1 wherein the end face forms lands between successive ones of the grooves, a total area of the grooves being less than a total area of the lands, as the areas are seen in a direction perpendicular to the end surface.

7. The tool according to claim 1 wherein each groove comprises two spaced apart side surfaces.

8. The tool according to claim 1 wherein each groove further comprise a concave bottom surface interconnecting the side surfaces.

9. The tool according to claim 1 further including a deflector arranged at a front end of the duct for deflecting the fluid flow from the duct to the grooves.

10. The tool according to claim 1 further including air inlet channels formed in the head and extending from the envelope surface to respective ones of the grooves, each air inlet channel intersecting the respective groove at a location adjacent the inlet end thereof.

11. The tool according to claim 2 wherein at least some of the branch ducts are curved from the inlet end to the outlet end thereof as viewed in a direction perpendicular to the end surface.

12. The tool according to claim 11 wherein the curvature of the curved branch ducts is cycloidal.

13. The tool according to claim 7 wherein the side surfaces are parallel to one another as seen in a cross section of each groove.

14. The tool according to claim 7 wherein the side surfaces are non-parallel to the axis as seen in a cross section of each groove.

15. The tool according to claim 7 wherein one of the side surfaces is parallel to the axis, and the other side surface is non-parallel to the axis, as seen in a cross section of each groove.

16. The tool according to claim 7 wherein the side surfaces are divergent from one another in a rearward direction away from the end surface.

17. The tool according to claim 7 wherein the side surfaces are parallel to the axis as seen in the cross section.

18. The tool according to claim 9 wherein at least a portion of each groove is left uncovered by the deflector to be forwardly open.

19. A tool for chip removing machining comprising a rotary head defining a longitudinal axis of rotation, the head including:
   an envelope surface arranged generally symmetrically relative to the axis;

a front end surface extending transversely relative to the axis;

a plurality of circumferentially spaced insert seats configured for receiving respective cutting inserts, each insert seat disposed in a transition region between the envelope surface and the end surface;

a main duct extending longitudinally within the head for conducting fluid, the main duct intersecting the end surface;

a plurality of branch ducts extending generally transversely outwardly from a fluid inlet end thereof communicating with the main duct, the branch ducts extending all the way to respective insert seats for conducting fluid from the main duct to the insert seats, each branch duct defined by a groove machined directly in the front end surface and configured to induce a flow of fluid from a fluid inlet end thereof to a fluid outlet end thereof in response to rotation of the head; and a deflector arranged at a front end of the main duct for deflecting the fluid flow from the main duct to the branch ducts, the deflector arranged on an element removably attached to the end surface.

20. The tool according to claim 19 wherein the element includes a plate and a hollow bushing extending from the plate, the bushing being coaxial with the axis of the head, and including a plurality of holes spaced apart circumferentially with reference to the axis, the holes being aligned with the inlet ends of respective ones of the branch ducts.

21. The tool according to claim 19 wherein the element comprises a plate wider than the main duct and attached by screws to the end surface.

22. The tool according to claim 20 further including a hollow screw attached to the end surface coaxially with the axis and defining a front portion of the main duct, the element being attached to the screw by a screw thread, and the screw attached to the head by a screw thread.

23. A tool for chip removing machining comprising a rotary head defining a longitudinal axis of rotation, the head including:

an envelope surface arranged generally symmetrically relative to the axis;

a front end surface extending transversely relative to the axis;

a plurality of circumferentially spaced insert seats configured for receiving respective cutting inserts, each insert seat disposed in a transition region between the envelope surface and the end surface a main duct extending longitudinally within the head for conducting fluid, the main duct intersecting the end surface; and a plurality of branch ducts extending transversely from the main duct for conducting fluid from the main duct to the insert seats, each branch duct defined by a groove formed in an end surface and configured to induce a flow of fluid from a fluid inlet end thereof to a fluid outlet end thereof in response to rotation of the head;

wherein the end face forms lands between successive ones of the grooves, a total area of the grooves being less than a total area of the lands, as the areas of the grooves and the lands are seen in a direction perpendicular to the end surface.

24. A tool for chip removing machining comprising a rotary head defining a longitudinal axis of rotation, the head including:

an envelope surface arranged generally symmetrically relative to the axis;

a front end surface extending transversely relative to the axis;

a plurality of circumferentially spaced insert seats configured for receiving respective cutting inserts, each insert seat disposed in a transition region between the envelope surface and the end surface;

a main duct extending longitudinally within the head for conducting fluid, the main duct intersecting the end surface; and a plurality of branch ducts extending transversely from the main duct for conducting fluid from the main duct to the insert seats, each branch duct defined by a groove formed in an end surface and configured to induce a flow of fluid from a fluid inlet end thereof to a fluid outlet end thereof in response to rotation of the head;

wherein each groove further comprises a concave bottom surface interconnecting the side surfaces.

25. A tool for chip removing machining comprising a rotary head defining a longitudinal axis of rotation, the head including:

an envelope surface arranged generally symmetrically relative to the axis;

a front end surface extending transversely relative to the axis;

a plurality of circumferentially spaced insert seats configured for receiving respective cutting inserts, each insert seat disposed in a transition region between the envelope surface and the end surface;

a main duct extending longitudinally within the head for conducting fluid, the main duct intersecting the end surface; and a plurality of branch ducts extending transversely from the main duct for conducting fluid from the main duct to the insert seats, each branch duct defined by a groove formed in an end surface and configured to induce a flow of fluid from a fluid inlet end thereof to a fluid outlet end thereof in response to rotation of the head;

wherein each groove comprises two spaced apart side surfaces which are oriented non-parallel to the axis as seen in a cross section of each groove.

26. A tool for chip removing machining comprising a rotary head defining a longitudinal axis of rotation, the head including:

an envelope surface arranged generally symmetrically relative to the axis;

a front end surface extending transversely relative to the axis;

a plurality of circumferentially spaced insert seats configured for receiving respective cuffing inserts, each insert seat disposed in a transition region between the envelope surface and the end surface;

a main duct extending longitudinally within the head for conducting fluid, the main duct intersecting the end surface; and a plurality of branch ducts extending transversely from the main duct for conducting fluid from the main duct to the insert seats, each branch duct defined by a groove formed in an end surface and configured to induce a flow of fluid from a fluid inlet end thereof to a fluid outlet end thereof in response to rotation of the head; and air inlet channels formed in the head and extending from the envelope surface to respective ones of the branch ducts, each air inlet channel intersecting the respective branch duct at a location adjacent the inlet end thereof.

27. A tool for chip removing machining comprising a rotary head defining a longitudinal axis of rotation, the head including:
- an envelope surface arranged generally symmetrically relative to the axis;
- a front end surface extending transversely relative to the axis;
- a plurality of circumferentially spaced insert seats configured for receiving respective cutting inserts, each insert seat disposed in a transition region between the envelope surface and the end surface;
- a main duct extending longitudinally within the head for conducting fluid, the main duct intersecting the end surface;
- a plurality of branch ducts extending transversely from the main duct for conducting fluid from the main duct to the insert seats, each branch duct defined by a groove formed in an end surface and configured to induce a flow of fluid from a fluid inlet end thereof to a fluid outlet end thereof in response to rotation of the head; and
- a deflector arranged at a front end of the main duct for deflecting the fluid flow from the main duct to the branch ducts, the deflector arranged on an element removably attached to the end surface, wherein the element includes a plate and a hollow bushing extending from the plate, the bushing being coaxial with the axis of the head, and including a plurality of holes spaced apart circumferentially with reference to the axis, the holes being aligned with the inlet ends of respective ones of the branch ducts.

* * * * *